(12) United States Patent
Mamei

(10) Patent No.: US 9,638,220 B2
(45) Date of Patent: May 2, 2017

(54) CONTROL APPARATUS FOR VEHICLES, OPERATING MACHINES OR THE LIKE

(75) Inventor: Enrico Mamei, Modena (IT)

(73) Assignee: STUDIO TECNICO 6M S.R.L., Modena (IT)

( * ) Notice: Subject to any disclaimer, the term of this patent is extended or adjusted under 35 U.S.C. 154(b) by 424 days.

(21) Appl. No.: 13/877,842

(22) PCT Filed: Oct. 4, 2011

(86) PCT No.: PCT/IB2011/002324
§ 371 (c)(1),
(2), (4) Date: May 2, 2013

(87) PCT Pub. No.: WO2012/046121
PCT Pub. Date: Apr. 12, 2012

(65) Prior Publication Data
US 2013/0209273 A1 Aug. 15, 2013

(30) Foreign Application Priority Data
Oct. 4, 2010 (IT) .............................. MO2010A0276

(51) Int. Cl.
*F15B 15/08* (2006.01)
*B60T 11/16* (2006.01)
*B60T 17/22* (2006.01)

(52) U.S. Cl.
CPC ............ *F15B 15/08* (2013.01); *B60T 11/165* (2013.01); *B60T 17/22* (2013.01)

(58) Field of Classification Search
CPC .... B60T 11/165; B60T 11/224; B60T 11/228; B60T 11/236; B60T 11/102; B60T 11/26; B60T 11/24
See application file for complete search history.

(56) References Cited

U.S. PATENT DOCUMENTS 3,938,333 A * 2/1976 Mathues ........................ 60/574
5,551,764 A * 9/1996 Kircher .................. B60T 7/042
188/156

(Continued)

FOREIGN PATENT DOCUMENTS

DE 10 2004 043152 7/2005
DE 10 2005 014414 9/2006

(Continued)

OTHER PUBLICATIONS

International Search Report dated Mar. 20, 2012, corresponding to PCT/IB2011/002324.

*Primary Examiner* — F. Daniel Lopez
*Assistant Examiner* — Richard Drake
(74) *Attorney, Agent, or Firm* — Young & Thompson

(57) ABSTRACT

The control apparatus includes operating fluid feeding and delivery lines, a pump-brake having a containment body which defines a sliding chamber and a main piston housed sliding inside the chamber, a control element controlling the movement of the main piston which can be operated by an operator, a control device for controlling the motion transmission of a vehicle or of an operating machine including a fixed part and a moving part suitable for cooperating together, wherein the moving part is suitable for moving through the operation of the control element and includes an auxiliary piston moving between a reference position and at least a detection position and mechanically connected to the moving part to move it with respect to the fixed part during its movement between the reference position and the detection position, the auxiliary piston moving towards the detection position through the movement of the main piston.

17 Claims, 5 Drawing Sheets

(56) References Cited

U.S. PATENT DOCUMENTS

| | | | | |
|---|---|---|---|---|
| 6,012,288 | A * | 1/2000 | Gualdoni et al. | 60/562 |
| 6,347,518 | B1 * | 2/2002 | Kingston | B60T 7/042 |
| | | | | 60/552 |
| 6,363,720 | B1 * | 4/2002 | Nakano et al. | 60/575 |
| 2007/0182403 | A1 * | 8/2007 | von Hayn et al. | 324/207.24 |
| 2007/0289827 | A1 * | 12/2007 | Isono | 188/358 |

FOREIGN PATENT DOCUMENTS

| | | |
|---|---|---|
| DE | 10 2008 064049 | 1/2010 |
| WO | 2004/089714 | 10/2004 |

* cited by examiner

CONTROL APPARATUS FOR VEHICLES, OPERATING MACHINES OR THE LIKE

TECHNICAL FIELD

The present invention relates to a control apparatus for vehicles, operating machines or the like.

BACKGROUND ART

Many operating machines, such as fork-lift trucks, shovels and the like offer the possibility of electronically controlling the transmission of movement from the motor to the wheels.

As technicians in the sector know, these operating machines have a function known as "inching" which allows the operator to reduce and control the speed of the operating machine by means of the brake pedal, thus changing the transmission conditions so as to adjust the traction.

During the first part of the brake pedal stroke, the "inching" function allows reducing the traction without operating the brakes.

More in particular, during the first part of the pedal stroke, the operator modulates the speed of the operating machine by adjusting the movement transmission speed, while in the second part of the stroke, the further movement of the pedal causes disengagement of the transmission and the direct operation of the brakes.

As technicians in the sector know, the "inching" function can be controlled by means of a command apparatus comprising a braking valve or a master cylinder.

In jargon, the master cylinder is also called "pump-brake", a definition this that will be used in the rest of the text.

The present invention relates to the type that makes use of a pump-brake for the control of the inching function.

As it is known, the control apparatuses belonging to this manufacturing type generally comprise:

a feeding line of an operating fluid connected to a collection tank;

a delivery line connected to the braking system;

a pump-brake which comprises a containment body having a chamber communicating with the feeding line and with the delivery line and a piston sliding in such chamber to distribute the operating fluid towards the delivery line;

control means, such as the brake lever or pedal, suitable for controlling mechanically the movement of the piston;

and at least a control device suitable for detecting the movements of the control means in such a way as to modify the transmission during the first part of their movement.

More in particular, the control devices used envisage the presence of a fixed part and a moving part, where the latter is operatively connected to the control means in such a way as to be affected by their movement.

The known command apparatus which use a pump-brake to control the inching function differ according to the ways the movement of the moving part of the control device is performed.

A first known solution envisages that the moving part of the control device be associated integral with the control means, which are directly connected to the pump-brake piston.

This first solution does however have a number of drawbacks.

In fact, such solution necessarily requires that the stroke of the control means be restricted in order to avoid the pressure inside the pump-brake from rising too far before the transmission has been completely disengaged with a consequent overheating effect that could cause damage to the vehicle.

A second known solution envisages that a part of the control device be associated integral with the control means and that the other part be associated with the pump-brake piston. The connection between the control means and the piston is achieved in such a way that the first part of the stroke of the control means themselves does not involve any movement of the piston but only the relative movement of the control device components. At the end of this first part of the stroke, the movement is interrupted relating to the parts of the control device and the further movement of the control means results in the movement of the piston and therefore the start of the braking stage.

This second solution also has its drawbacks however.

In fact, because the first part of the stroke of the control means does not result in any piston movement, it follows that the second part of the stroke of the control means (which therefore starts after the relative movement between the components of the control device has stopped and after the traction has been deactivated) must cause both the calipers to move closer to the brakes and the braking stage itself.

Because the braking stage takes place during a reduced stroke of the control means, the pump-brake piston must have a large diameter, which consequently results in a heavy load on the control means and therefore considerable effort on the part of the user.

A third solution of known type envisages that the control device be positioned along the delivery line of the pump-brake and that it switches on therefore following the increase in pressure along the delivery line itself.

This solution too has its drawbacks.

In fact, the positioning of the control device along the delivery line of the pump-brake results in the transmission only being reduced after the braking action has begun.

DESCRIPTION OF THE INVENTION

The main aim of the present invention is to provide a control apparatus for vehicles, operating machines or the like which allows overcoming the drawbacks of the state of the art and more in particular allows controlling the transmission in the initial stage of the stroke of the control means, maintaining at the same time a long stroke of same and a reduced displacement, so as to reduce the effort that has to be made by the user.

Another object of the present invention is to provide a control apparatus for vehicles, operating machines or the like that allows overcoming the mentioned drawbacks of the state of the art in the ambit of a simple, rational, easy and effective to use as well as low cost solution.

The above objects are achieved by the present control apparatus for vehicles, operating machines or the like, comprising:

at least a feeding line of an operating fluid connectable to a collection tank;

at least a delivery line of the operating fluid connectable to a braking system or to another use point;

at least a pump-brake having a containment body which defines a sliding chamber communicating with said feeding line and with said delivery line, a main piston housed sliding inside said chamber and moving between an idle position and at least a distribution position in which it is suitable for distributing at least a part of the operating fluid towards said delivery line;

control means for controlling the movement of said main piston which can be operated by an operator;

at least a control device for controlling the motion transmission of a vehicle or of an operating machine comprising a fixed part and a moving part suitable for cooperating together, wherein said moving part is suitable for moving through the operation of said control means;

characterised by the fact that it comprises at least an auxiliary piston housed at least partially in said chamber and moving between a reference position and at least a detection position and by the fact that said auxiliary piston is mechanically connected to said moving part to move it with respect to said fixed part during its movement between said reference position and said detection position, said auxiliary piston moving towards said detection position through the movement of said main piston towards said distribution position.

BRIEF DESCRIPTION OF THE DRAWINGS

Other characteristics and advantages of the present invention will become more evident from the description of a preferred, but not sole, embodiment of a control apparatus for vehicles, operating machines or the like, illustrated purely as an example but not limited to the annexed drawings in which.

EMBODIMENTS OF THE INVENTION

Figure 1:
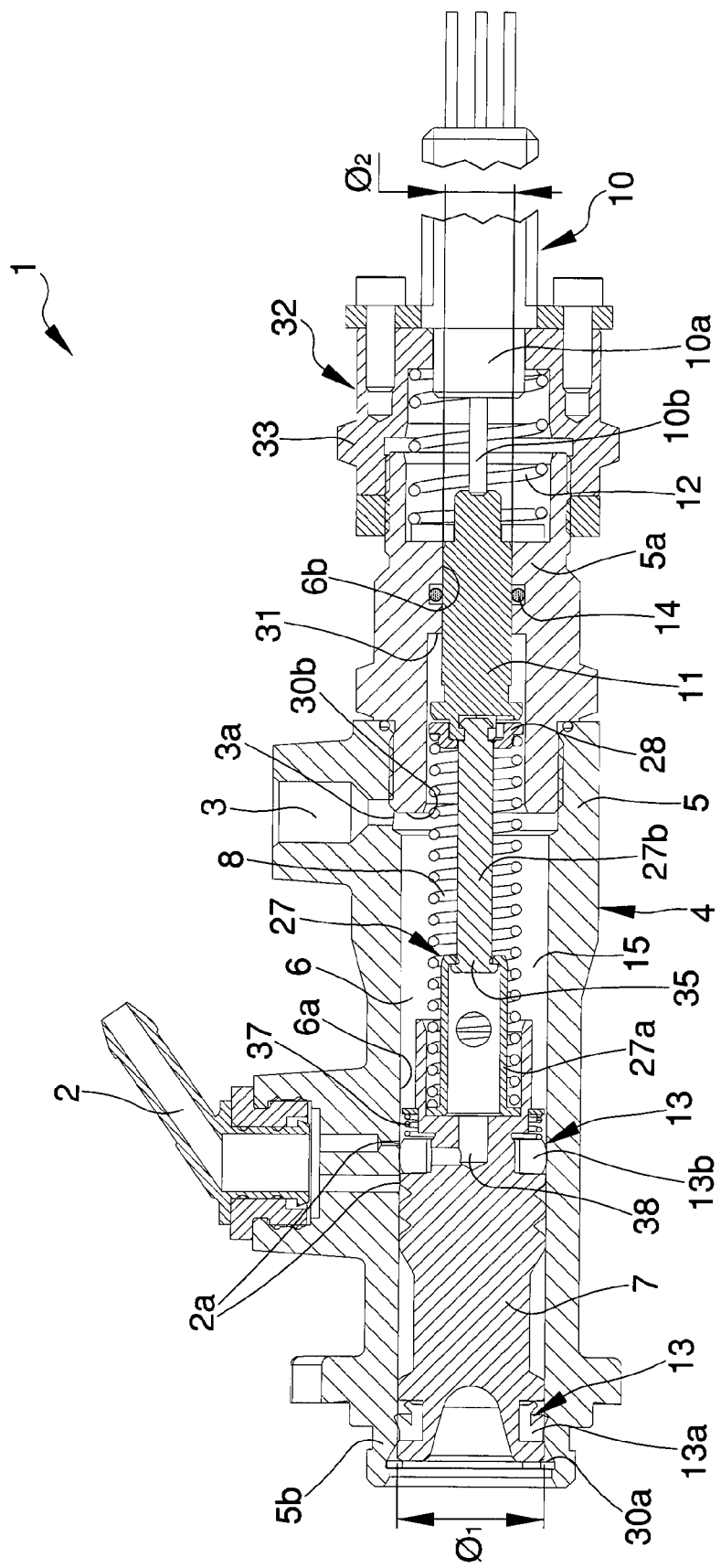
FIG. 1 is a section view of a control apparatus according to the invention.
Figure 2:
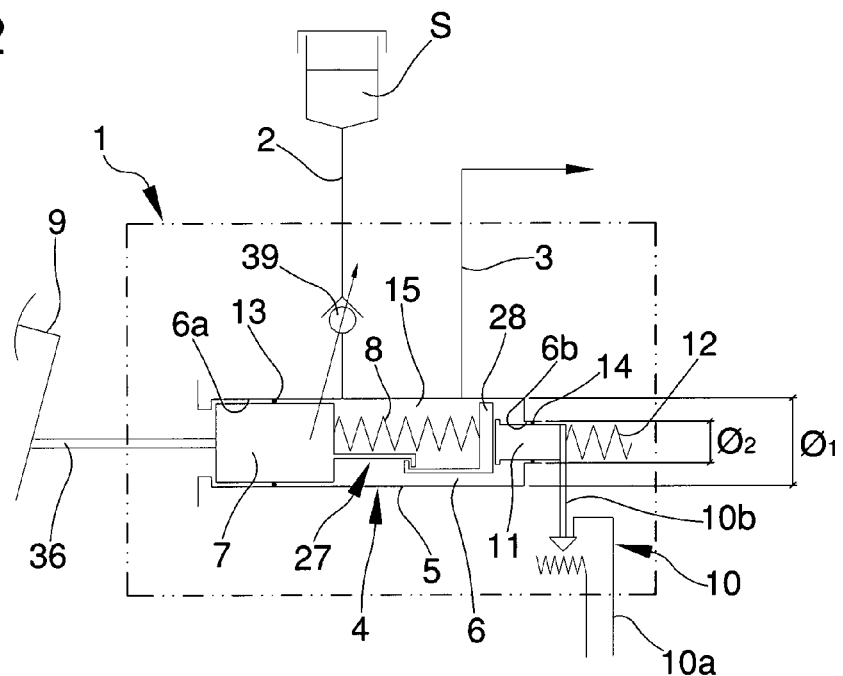
FIG. 2 is a hydraulic diagram of the control apparatus according to the invention in a first embodiment.

With particular reference to such figures, globally indicated by 1 is a control apparatus for vehicles, operating machines or the like.

More in particular, the apparatus 1 can have various applications, e.g., it can be used to control the inching function in the operating machines, so as to disengage the transmission from the accelerator pedal, to put the transmission in braking conditions or to pilot other braking means present on the vehicle, e.g., for the purpose of recovering energy.

The apparatus 1 comprises at least a feeding line 2 of an operating fluid, e.g. oil, connectable to a fluid collection tank S and at least a delivery line 3 of the operating fluid connectable to a braking system or to another use point.

The apparatus 1 also comprises at least a pump-brake 4 (where, as anticipated above, such word is used here to identify the master cylinder) having a body 5 which defines a sliding chamber 6 communicating with the feeding line 2 and with the delivery line 3. Inside the chamber 6 is housed sliding a main piston 7, which is mobile between an idle position and at least a distribution position in which it is suitable for distributing at least a part of the operating fluid contained in the chamber 6 towards the delivery line 3.

More in particular, the chamber 6 has at least a first port 2a communicating with the feeding line 2 and at least a second port 3a communicating with the delivery line 3. Along the feeding line 2 is arranged at least one unidirectional valve 39 suitable for allowing the flow of the operating fluid from the tank S towards the chamber 6 and not vice versa.

The main piston 7, in the distribution position, is brought closer to the second port 3a compared to the idle position.

The gradual movement of the main piston 7 towards the second port 3a involves a corresponding increase in the quantity of operating fluid conveyed along the delivery line 3.

The main piston 7 therefore has a plurality of distribution positions defined by its movement from the idle position towards the second port 3a until it reaches a final distribution position corresponding to the end-of-stroke position. The other end-of-stroke position of the main piston 7 corresponds to the idle position.

Suitably, the body 5 has a pair of first locator surfaces 30a, 30b suitable for defining the end-of-stroke positions of the main piston 7.

In the present description, the following terminology is used in relation to the movements of the main piston 7: by forward stroke is meant its movement from the idle position towards the distribution position (corresponding to the movement towards the right in the attached illustrations), while by return stroke is meant the movement in the opposite direction, meaning from the distribution position towards the idle position (corresponding to the movement towards the left in the attached illustrations).

The apparatus 1 also comprises control means 9 for controlling the movement of the main piston 7 which can be operated by an operator, such as the brake lever or pedal of a vehicle or of an operating machine.

The main piston 7 therefore moves from the idle position to the distribution position as a result of the start of the control means 9.

Furthermore, the apparatus 1 has at least a control device 10 for controlling the transmission of the vehicle or of the operating machine having a fixed part 10a and a moving part 10b suitable for cooperating together, where the moving part 10b is suitable for moving with respect to the fixed part 10a as a result of the operation of the control means 9.

The sensor device 10 can therefore be operatively linked to the vehicle transmission or to that of the operating machine and is suitable for changing the transmission conditions according to the position of the moving part 10b with respect to the fixed part 10a. The control device 10 can operate on the vehicle transmission by means of transmission control means of the electronic or fluid dynamic type, not shown in the illustrations.

The kinematic coupling between the fixed part 10a and the moving part 10b can be of the linear type, as in the embodiments shown in the figures, or of the rotary type.

Suitably, the control device 10 is of the type of a sensor device, e.g., a potentiometer or a sensor of different type, suitable for emitting an electric signal.

In an alternative embodiment, not shown in the illustrations, the control device can be of the type of a valve suitable for changing the transmission conditions of the vehicle or of the operating machine. In this embodiment, the moving part 10b of the control device 10 corresponds substantially to a mobile piston suitable for discharging a certain flow rate of a operating fluid. Although the embodiments shown in the illustrations relate to the solution whereby the control device 10 is of the sensor type, it is intuitive for the technician in the sector to adapt them to the case whereby the control device 10 is of the valve type.

According to the invention, the apparatus 1 comprises at least an auxiliary piston 11 housed at least partially inside the chamber 6 and moving between a reference position and at least a detection position other than the reference position. The auxiliary piston 11 is mechanically connected to the moving part 10b of the control device 10 to move it with respect to the fixed part 10a and is operatively connected to the main piston 7 in such a way as to move towards a detection position due to the movement of the main piston itself towards a distribution position.

The connection between the auxiliary piston 11 and the moving part 10b can be of the linear type, as shown in the attached illustrations wherein the moving part 10b is associated integral with the auxiliary piston 11, or can be of the rotary type, meaning the movement of the auxiliary piston 11 translates into a corresponding rotation of the moving part 10b by means of a mechanism of known type.

More in particular, the body 5 has at least an open extremity 5a through which protrudes the extremity of the auxiliary piston 11 opposite the main piston 7 and integral to the moving part 10b.

In the embodiments shown in the figures, the body 5 has both extremities 5a and 5b open and it is therefore axially crossed by the chamber 6.

The auxiliary piston 11 also moves from the reference position towards the detection position, where the control device 10 sends a corresponding signal to the transmission control means as a result of the start of the control means 9.

The auxiliary piston 11 has a plurality of detection positions due to the gradual movement of the moving part 10b until a final detection position is reached corresponding to the end-of-stroke position. The other end-of-stroke position of the auxiliary piston 11 corresponds to the reference position.

Suitably, the body 5 has at least a locator surface 31 suitable for defining at least the forward end-of-stroke position of the auxiliary piston 11.

In the present description, the following terminology is used in relation to the movements of the auxiliary piston 11: by forward stroke is meant its movement from the reference position towards the detection position (corresponding to the movement towards the right in the attached illustrations), while by return stroke is meant the movement in the opposite direction, meaning from the detection position towards the reference position (corresponding to the movement towards the left in the attached illustrations).

The reference position of the auxiliary piston 11 depends on the initial start position of the moving part 10b with respect to the fixed part 10a.

Advantageously, the apparatus 1 comprises adjustment means 32 for adjusting the reference position of the auxiliary piston 11.

More in detail, the adjustment means 32 comprise a cover 33 screwed onto the body 5 in correspondence to its extremity 5b through which protrudes the auxiliary piston 11. The cover 33 supports the fixed part 10a of the control device 10 and, consequently, by changing its position with respect to the body 5, it allows regulating the start position of the fixed part itself with respect to the auxiliary piston 11 and therefore with respect to the moving part 10b.

Preferably, the stroke of the main piston 7 is greater than the stroke of the auxiliary piston 11, and such pistons 7 and 11 move in a way integral the one with the other at least during the first part of the stroke of the main piston 7 from the idle position to the distribution position.

The forward stroke of the main piston 7 results in the gradual conveyance of the operating fluid towards the delivery line 3 while the forward stroke of the auxiliary piston 11 causes a change of vehicle transmission as a result of the signal sent by the control device 10.

Advantageously, the auxiliary piston 11 is suitable for moving from the reference position towards a detection position through the increase in pressure, due to the movement of the main piston itself towards a distribution position, inside the portion of the chamber 6 placed between the main piston 7 and the auxiliary piston 11.

Preferably, in addition or alternatively to what has been expounded in the previous paragraph, the auxiliary piston 11 is moved mechanically by the main piston 7 during its movement towards a distribution position. More in particular, the apparatus 1 comprises mechanical connection means 27 for connecting the main piston 7 to the auxiliary piston 11.

The movement of the auxiliary piston 11 towards the detection position is therefore due to the effect of the increase in pressure consequent to the movement of the main piston 7 and/or of the mechanical connection means 27. Advantageously, the mechanical connection means 27 are configured so as to make the auxiliary piston 11 integral with the main piston 7 at least during the first part of the stroke of the latter towards the distribution position.

During the first part of the stroke of the main piston 7, the main piston 7 and the auxiliary piston 11 behave as a single body piece.

Preferably, as shown in the figures from 1 to 7, the mechanical connection means 27 comprise main elastic means 8 placed between the main piston 7 and the auxiliary piston 11. The apparatus 1 then comprises auxiliary elastic means 12 suitable for pushing the auxiliary piston 11 towards the detection position. The main elastic means 8, for example, made of a pre-compressed spring, have an initial pre-charge greater or at most the same as the initial pre-charge of the auxiliary elastic means 12, for example, these too made of a pre-compressed spring. Such distribution of the pre-charges results in the movement of the main piston 7 causing, by means of the main elastic means 8, the movement of the auxiliary piston 11 in contrast to the auxiliary elastic means 12 during the first part of its forward stroke.

Preferably, the rigidity of the spring making up the auxiliary elastic means 12 is greater than that of the spring making up the main elastic means 8. Depending on the amount of rigidity of the springs used, the sequence of the movements can be changed, as can therefore the start/end of the variation phases of the transmission and braking, of the main piston 7 and of the auxiliary piston 11 following the first part of the stroke of the main piston itself during which they are integral the one with the other.

The auxiliary elastic means 12 are suitable for pushing the auxiliary piston 11 towards the reference position and can be arranged outside the body 5, as shown in FIG. 1, or else inside it.

Figure 3:
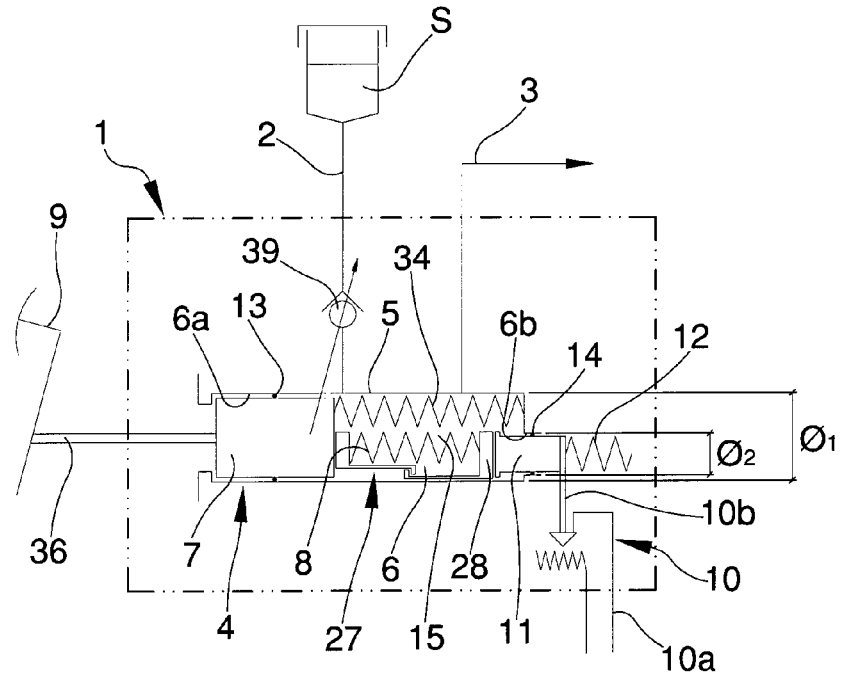
FIG. 3 is a hydraulic diagram of the control apparatus according to the invention in a second embodiment.
Figure 4:
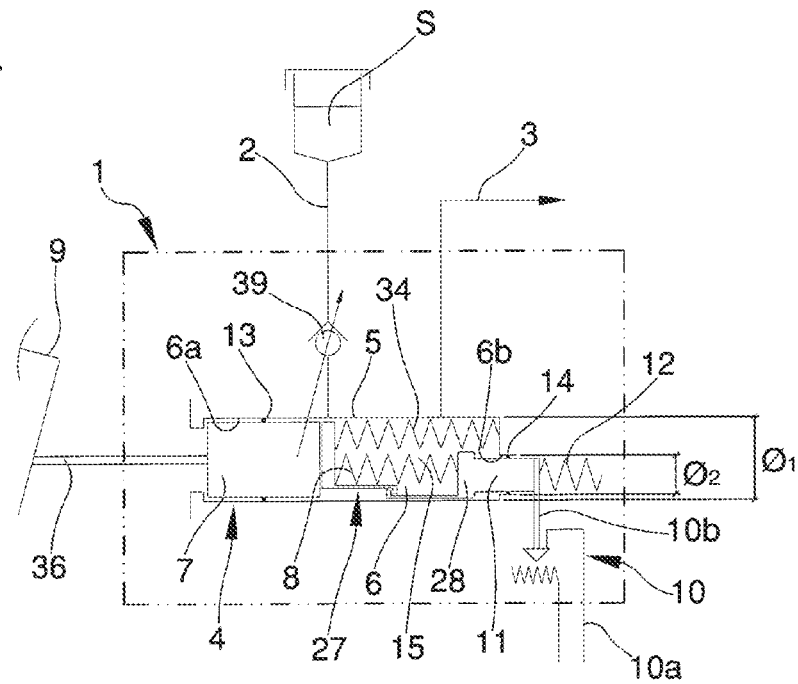
FIG. 4 is a hydraulic diagram of the control apparatus according to the invention in a third embodiment.
Figure 8:
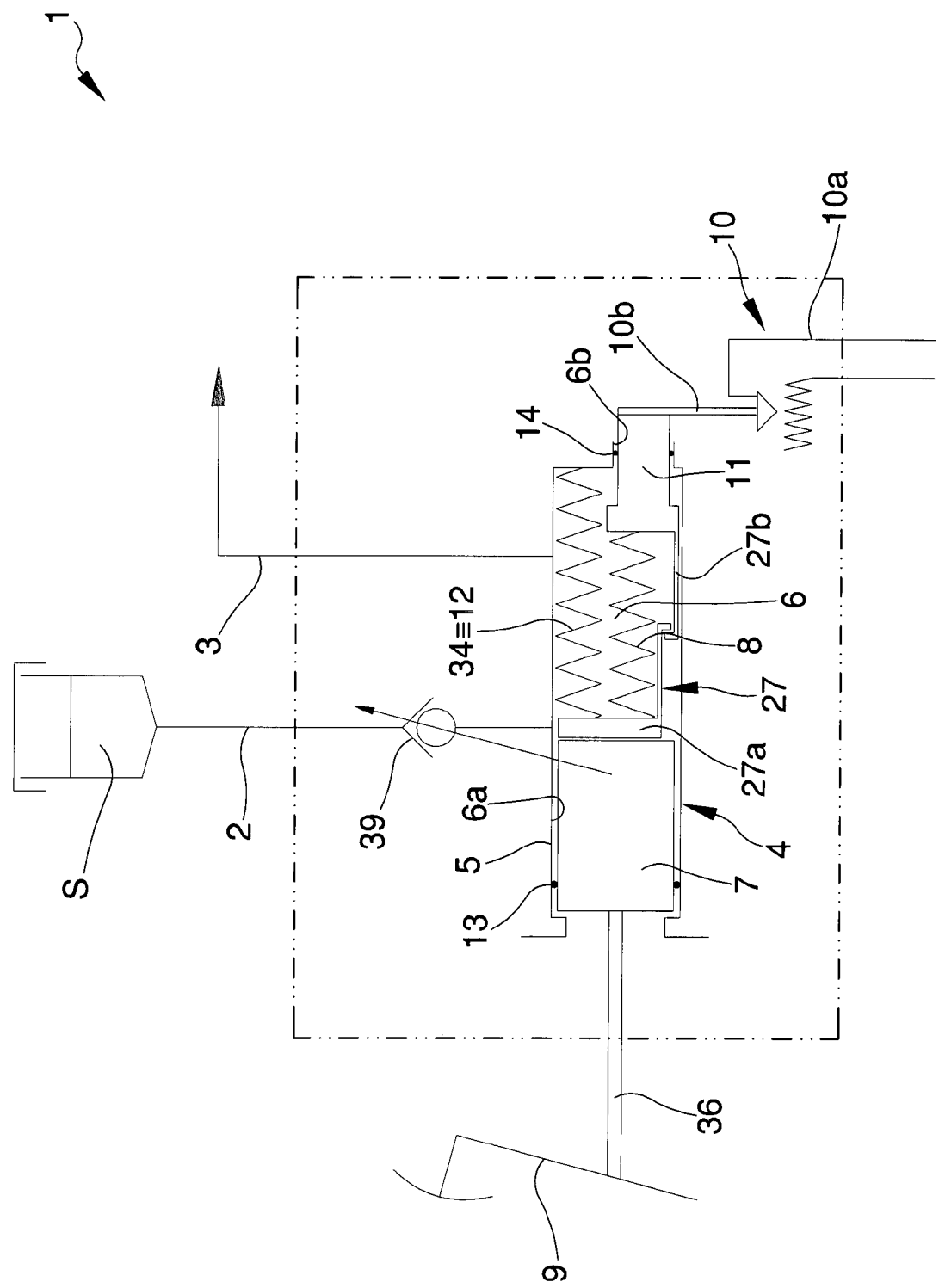
FIG. 8 is a hydraulic diagram of a seventh embodiment.

Advantageously, as shown in the FIGS. 3, 4 and 8, the apparatus 1 can also comprise additional elastic means 34 placed between the main piston 7 and the body 5 and suitable for contrasting the movement of the main piston itself towards the distribution position. The additional elastic means 34 therefore have the function of ensuring the return of the main piston 7 to the idle position when the operation of the control means 9 ends up.

More in particular, as shown in the section of FIG. 1 and in the hydraulic diagrams shown in the figures from 2 to 8, the mechanical connection means 27 also comprise at least a first connection element 27a which cooperates with the main piston 7 and at least a second connection element 27b which cooperates with the auxiliary piston 11. More in detail, the first connection element 27a is pushed by the main piston 7 during its forward stroke, while the second connection element 27b is pushed by the auxiliary piston 11 during its return stroke.

Preferably, the first or the second connection element 27a and 27b is integrally associated with the main piston 7 and the auxiliary piston 11 respectively while the other connection element 27b or 27a is released with respect to the auxiliary piston 11 and the main piston 7.

The main elastic means 8 are positioned between the first and the second connection element 27a and 27b and are of the pre-compressed type.

Advantageously, the first and the second connection elements 27a and 27b are mechanically linked in such a way as to prevent the extension of the main elastic means 8 beyond a preset distance during the movements relating to the main piston 7 and to the auxiliary piston 11.

In the embodiments shown in the FIGS. 4 and 8, the additional elastic means 34 are placed between the body 5 and the first connection element 27a.

More in detail, in the embodiment shown in FIG. 8, the thrust exercised by the additional elastic means 34 on the first connection element 27a, translates into a return action on the second connection element 27b, integral with the auxiliary piston 11, when the distance between the first and the second connection elements 27a and 27b reaches the above preset distance. In this embodiment, the additional elastic means 34 coincide substantially with the auxiliary elastic means 12.

Suitably, between the second connection element 27b and the auxiliary piston 11 is arranged at least a thrust element 28 having a diameter greater than that of the auxiliary piston itself. The thrust element 28 can be defined integral with the auxiliary piston 11 and/or with the second connection element 27b. Different embodiments without the thrust element 28 cannot however be ruled out.

In the preferred embodiment shown in the section of FIG. 1, the first connection element 27a is made up of an internally hollow body communicating with the portion of the chamber 6 placed between the main piston 7 and the auxiliary piston 11 and the second connection element 27b is made up of a solid body integrally associated with the auxiliary piston 11 and fitted with one of its extremities 35 inside the first connection element 27a.

The extremity 35 has a swelling suitable for engaging with the first connection element 27a during the movement of the second connection element 27b in a direction (corresponding to the movement of the auxiliary piston 11 towards the detection position) or of the first connection element 27a in the opposite direction.

In the same way, the first connection element 27a slides with respect to the second connection element 27b when the main elastic means 8 are compressed, as a result of the movement relating to the main piston 7 and to the auxiliary piston 11, reducing their extension compared to the above mentioned preset distance.

In this embodiment, the spring 8 is fitted around the first and the second connection element 27a and 27b and has an extremity associated with the first connection element itself and the opposite extremity associated with the thrust element 28.

Advantageously, the chamber 6 defines at least a first section 6a having a first diameter $\Phi_1$ and in which the main piston 7 is housed and at least a second section 6b having a second diameter $\Phi_2$ smaller than the first diameter $\Phi_1$ and in which the auxiliary piston 11 is housed.

Suitably, between the first section 6a and the main piston 7 are placed first main sealing means 13 and between the second section 6b and the auxiliary piston 11 are placed auxiliary sealing means 14 so as to define in the chamber 6 at least one thrust sealed half-chamber 15 placed between the first main sealing means 13 and the auxiliary sealing means 14. It results therefore that pressure inside the thrust half-chamber 15 progressively increases as a consequence of the movement of the main piston 7 towards the distribution position.

In the embodiment shown in FIG. 1, the first main sealing means 13 comprise two seals 13a and 13b arranged in succession along the main piston 7, of which the first seal 13a is fitted inside a respective groove obtained on the main piston 7 while the second seal 13b is kept in support against the shoulder obtained on the main piston itself by means of a spring 37. Such second seal 13b, i.e., that closest to the auxiliary piston 11, seals up against the shoulder obtained on the main piston 7 and against the wall of the first section 6a. Inside the main piston 7, below the second seal 13b, a channel 38 is obtained communicating with the inside of the first connection element 27a, suitable for ensuring the flow of operating fluid inside the chamber 6 during the return stroke of the main piston 7 in the condition wherein the pressure in the chamber 6 is below the pressure in the feeding line 2 and, due to this pressure difference, the seal 13b separates from the above shoulder.

In the embodiment shown in FIG. 1, the first main sealing means 13 are therefore integral to the main piston 7. Different embodiments cannot however be ruled out in which the first main sealing means 13 are integrally associated with the body 5 and therefore the main piston 7 is mobile compared to them.

The auxiliary sealing means 14, on the contrary, comprise a seal fitted inside a seat obtained on the body 5 in correspondence to the second section 6b. The auxiliary piston 11 is therefore mobile compared to the seal 14.

Figure 6:
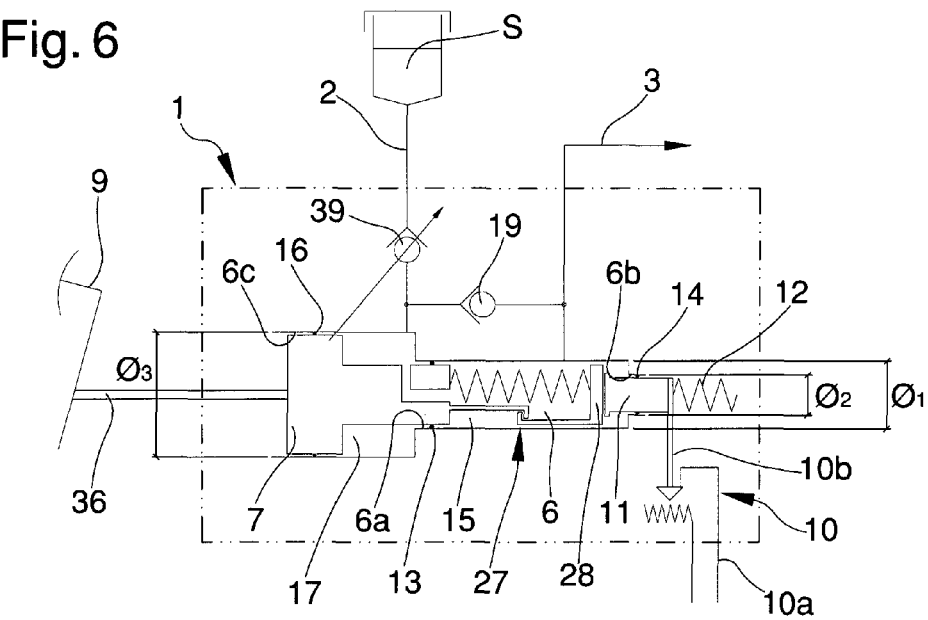
FIG. 6 is a hydraulic diagram of the control apparatus according to the invention in a fifth embodiment.

In an alternative embodiment, shown in FIG. 6, the chamber 6 also has a third section 6c having a third diameter $\Phi_3$ bigger than the first diameter $\Phi_1$ and in which the main piston 7 is housed. Between the third section 6c and the main piston 7 are placed second main sealing means 16. In the chamber 6 is therefore defined a further half-chamber 17 between the first and the second main sealing means 13 and 16 and adjacent to the thrust half-chamber 15.

In this embodiment, the main piston 7 therefore has two different active diameters, corresponding to the first and the third diameter $\Phi_1$ and $\Phi_3$ respectively in such a way as to achieve a variation of displacement which allows, in the case wherein the delivery line 3 is connected to a braking system, a rapid approach of the calipers to the brakes during the first part of the stroke of the main piston 7 and precise and controlled braking during the final part of its stroke.

In the embodiment shown in FIG. 6, the further half-chamber 17 is placed in communication with the feeding line 2 and the thrust half-chamber 15 is placed in communication with the delivery line 3. Suitably, between the feeding line 2 and the delivery line 3 a connection line 18 is placed having at least a unidirectional valve 19 suitable for allowing the flow of the operating fluid from the feeding line 2 towards the delivery line 3. Furthermore, the half-chamber 17 is placed in communication with the thrust half-chamber 15 with the main piston 7 in idle position.

Figure 5:
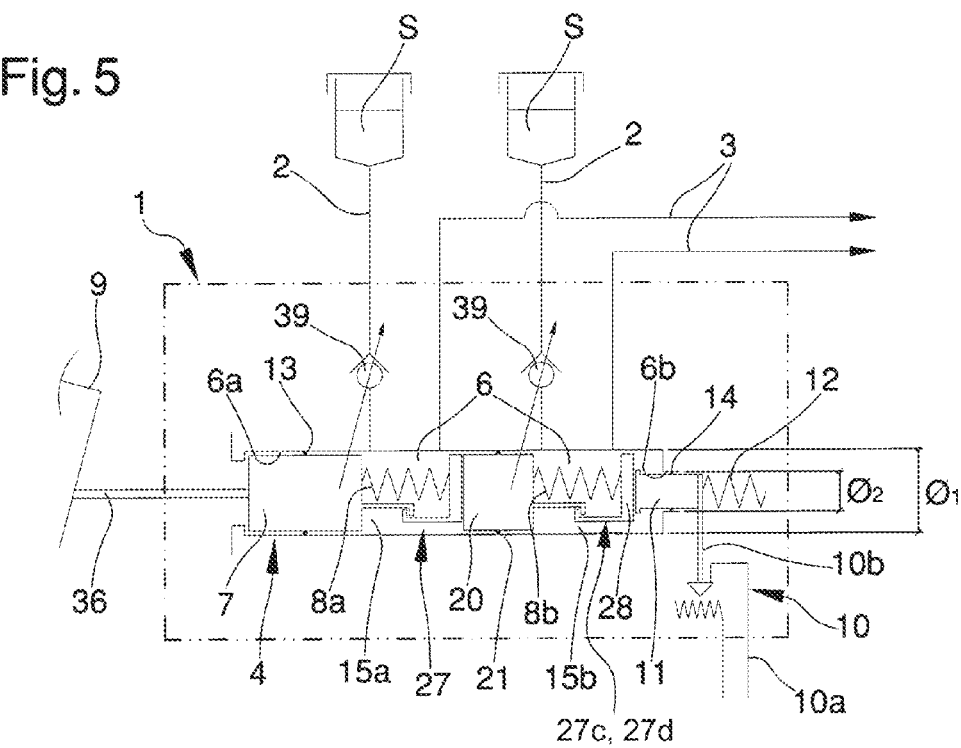
FIG. 5 is a hydraulic diagram of the control apparatus according to the invention in a fourth embodiment.

In a further embodiment, shown in FIG. 5, the pump-brake 4 also comprises an intermediate piston 20 housed inside the chamber 6 and placed between the main piston 7 and the auxiliary piston 11. Between the body 5 and the intermediate piston 20 are placed intermediate sealing means 21, which split the thrust half-chamber 15 into a first and a second thrust half-chamber 15a and 15b adjacent to one another.

Suitably, the first and the second thrust half-chamber 15a and 15b are in communication with a respective feeding line 2 and a respective delivery line 3.

In this embodiment shown in FIG. 5, the main elastic means 8 comprise first and second main elastic means 8a and 8b, for example both made up of respective pre-compressed springs, placed between the main piston 7 and the intermediate piston 20 and between the latter and the auxiliary piston 11. The preload of the first and second main elastic means 8a and 8b is bigger than or the same as the preload of the auxiliary elastic means 12, in such a way as to ensure that during the first part of the stroke of the main piston 7 the intermediate piston 20 and the auxiliary piston 11 move integrally with it.

In the embodiment of FIG. 5 the mechanical connection means 27 comprise a third and a fourth connection element 27c and 27d suitable for cooperating with the intermediate piston 20 and connected, respectively, to the first and second connection element 27a and 27b, thus forming two pairs of connection elements, 27a, 27c and 27b, 27d respectively, mechanically connected to each other. Each of such pairs 27a, 27c and 27b, 27d can have a structure similar to that described above for the FIG. 1, that is concerning the case in which the first and second connection element 27a and 27b are directly connected together without the interposition of other elements. The two pairs of connection elements 27a, 27c and 27b, 27d are suitable for preventing the extension of the first and second main elastic means 8a and 8b, respectively, beyond relative preset distances.

Figure 7:
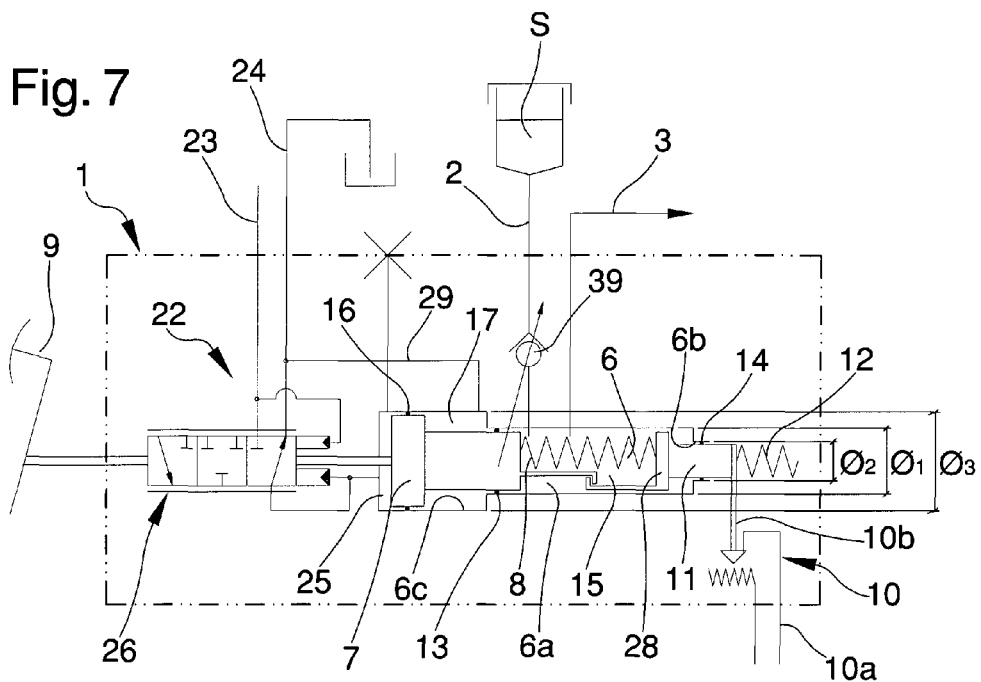
FIG. 7 is a hydraulic diagram of the control apparatus according to the invention in a sixth embodiment.

The control means 9 can be connected to the main piston 7 by means of mechanical means 36, as shown in the figures from 1 to 6 or by means of mechanical-fluid dynamic means 22, as shown in the hydraulic diagram of FIG. 7.

In the embodiment of FIG. 7, the mechanical-fluid dynamic means 22 comprise at least a further feeding line 23 and at least a discharge line 24. Furthermore, the body 5 and the main sealing means 13, 16 define in the chamber 6 a third half-chamber 25 operating on the main piston 7 and arranged opposite the thrust half-chamber 15. Such third half-chamber 25 is connectable to at least one between the further feeding line 23 and the discharge line 24.

More particularly, in the embodiment shown in FIG. 7, the third half-chamber 25 is placed between the second main sealing means 16 and the extremity 5b of the body 5 opposite the extremity 5a through which protrudes the auxiliary piston 11.

Advantageously, the fluid dynamic means 22 comprise at least a distribution valve 26 placed between the control means 9 and the main piston 7. Such distribution valve 26 is mobile between at least a first position, wherein it puts the further feeding line 23 in communication with the third half-chamber 25 to allow the movement of the main piston 7 towards a distribution position, and at least a second position, wherein it puts the discharge line 24 in communication with the third half-chamber 25 to allow the return of the main piston 7 towards the idle position.

Preferably, the movement of the distribution valve 26 from the second towards the first position is controlled by the control means 9 while its movement from the first towards the second position is controlled by the sum of the pressures present in the further feeding line 23 and in the discharge line 24.

Suitably, the fluid dynamic means 22 also comprise a connection line 29 of the further half-chamber 17, placed between the main sealing means 13 and 16 with the discharge line 24, in such a way as to allow the inflow and the outflow of the operating fluid contained in it during the forward and return stroke respectively of the main piston 7.

In the various embodiments thus far described, each half-chamber mentioned has a respective operating fluid inlet and/or outlet port.

The present invention operates as follows.

The operator, for example in the case of wanting to reduce the speed of a vehicle equipped with the apparatus 1 according to the invention, operates the control means 9. The operation of the control means 9, corresponding for example to the movement of the brake pedal, causes the consequent movement of the main piston 7.

More in particular, in normal vehicle operation condition, i.e., with the control means 9 off, the main piston 7 and the auxiliary piston 11 are in idle position and reference position respectively.

The action exercised by the operator on the control means 9 thus causes, in a mechanical and/or fluid dynamic way, the movement of the main piston 7 from such idle position towards a distribution position.

More in particular, in the embodiments shown in the figures from 1 to 6, the movement of the control means 9 is transferred directly to the main piston 7 by means of the mechanical means 36.

In the embodiment shown in FIG. 7, on the other hand, the start of the control means 9 causes the movement of the distribution valve 26 in the first position described above, in such a way as to put the third half-chamber 25 in communication with the further feeding line 23. In this operating condition, the operating fluid enters the third half-chamber 25 consequently pushing the main piston 7 towards the second port 3a.

The first part of the movement of the main piston 7 towards the second port 3a also causes the movement of the auxiliary piston 11 from the reference position towards a detection position.

In fact, following the movement of the main piston 7, the main elastic means 8 push the auxiliary piston 11 towards the detection position due to their greater pre-charge with respect to the auxiliary elastic means 12.

Furthermore, always following the movement of the main piston 7, the pressure inside the thrust half-chamber 15 increases due to its reduction in volume and acts on the auxiliary piston 11.

It follows, therefore, that during the first part of the stroke of the main piston 7, the auxiliary piston 11 moves from the reference position towards a detection position in contrast with the auxiliary elastic means 12. The movement of the auxiliary piston 11 changes the position of the moving part 10b with respect to the fixed part 10a and the control device 10 therefore sends a corresponding signal to the vehicle transmission control means.

As already said above, the sequence of the subsequent movements of the main piston 7 and of the auxiliary piston 11 can be regulated according to choices of a construction character, e.g., by changing the rigidity of the springs making up the main elastic means 8 and the auxiliary elastic means 12.

During the second part of the forward stroke of the main piston 7, before or after the auxiliary piston 11 has reached the forward end-of-stroke position depending on the configuration used, the spring 8 is compressed causing the first connection element 27a to slide with respect to the second connection element 27b.

As soon as the operator action on the control means 9 ceases, and these return towards the start position, the main piston 7 starts its return stroke towards the idle position (corresponding to the movement to the left on the attached illustrations).

In the embodiment in FIG. 7, this operating condition corresponds to the movement of the distribution valve 26 in the second position described above, wherein the third half-chamber 25 is put in communication with the discharge line 24.

During the return stroke, the spring 8 is extended, causing the sliding of the first connection element 27a on the second connection element 27b in the direction opposite to that previously described, until the preset distance is reached in correspondence to which the extremity 35 engages with the first connection element 27a and the mechanical connection means 27a and 27b start moving again in an integral way.

The auxiliary piston 11, due to the thrust of the auxiliary elastic means 12, also starts its return stroke towards the reference position.

In the embodiments shown in the figures from 3 to 4, the additional elastic means 34 also intervene during the return stroke of the main piston 7 pushing it towards the idle position.

During the return stroke of the main piston 7 the volume of the thrust half-chamber 15 gradually increases, thus calling the operating fluid back from the tank S.

In the event of its also having the intermediate piston 20, the operation of the apparatus 1, as shown in FIG. 5, is more or less the same as that described above.

In fact, during the first part of the stroke of the main piston 7, the auxiliary piston 11 and the intermediate piston 20 also move in a substantially integral way with the main piston itself due to the different pre-charges of the relative elastic means 8a, 8b and 12 described above.

The sequence of the movements of the pistons 7, 11 and 20 consequent to the further operation of the control means 9 can vary, as described above, according to the types of construction of the apparatus 1.

The return phase of the main piston 7 causes the movement of the intermediate piston 20 and of the auxiliary piston 11 in a reverse sequence to that relating to the forward phase.

It has in point of fact been ascertained how the present invention achieves the proposed objects, and in particular the fact is underlined that the presence of the auxiliary piston operatively connected to the main piston and having a smaller diameter with respect to the latter allows achieving a long stroke of the control means, thus easily controlling the traction of the first phase of their stroke, and at the same time obtaining a reduced loss of displacement, in such a way as to manage to control the braking phase in a precise way and without too much effort on the part of the operator.

The invention claimed is:
1. Control apparatus (1) for vehicles and operating machines, comprising:
   at least a feeding line (2) of an operating fluid connectable to a collection tank (S);
   at least a delivery line (3) of the operating fluid connectable to a braking system or to another use point;
   at least a pump-brake (4) having a containment body (5) which defines a sliding chamber (6) communicating with said feeding line (2) and with said delivery line (3), a main piston (7) housed sliding inside said sliding chamber (6) and moving between an idle position and at least a distribution position suitable for distributing at least a part of the operating fluid towards said delivery line (3), wherein the containment body (5) has at least an open extremity (5a) and thus provides a non-sealed, open chamber;
   a brake lever or pedal (9) connected to the main piston (7), wherein movement of the brake lever or pedal (9) by an operator controls the movement of said main piston (7);
   at least a control device (10) for controlling the motion transmission of a vehicle or of an operating machine comprising a fixed part (10a) and a moving part (10b) suitable for cooperating together, wherein said moving part (10b) is suitable for moving through the operation of said brake lever or pedal (9);
   at least an auxiliary piston (11) housed at least partially in said sliding chamber (6) and moving between a reference position and at least a detection position and by the fact that said auxiliary piston (11) is mechanically connected to said moving part (10b) to move said moving part (10b) with respect to said fixed part (10a) during said auxiliary piston's (11) movement between said reference position and said detection position, said auxiliary piston (11) moving towards said detection position through the movement of said main piston (7) towards said distribution position,
   wherein the auxiliary piston (11) includes an extremity opposite the main piston (7) and integral to the moving part (10b), the extremity of the auxiliary piston (11) protruding through the at least one open extremity (5a) of the containment body (5), and
   wherein said sliding chamber (6) defines at least a first section (6a) having a first diameter ($\Phi_1$) and in which said main piston (7) is housed and at least a second section (6b) having a second diameter ($\Phi_2$) smaller than said first diameter ($\Phi_1$) and in which said auxiliary piston (11) is housed; and
   first main sealing means (13) placed between said first section (6a) and said main piston (7) and auxiliary sealing means (14) placed between said second section (6b) and said auxiliary piston (11) so as to define in said sliding chamber (6) at least one thrust sealed half-chamber (15) placed between said first main sealing means (13) and said auxiliary sealing means (14), and
   wherein said auxiliary piston (11) has a diameter smaller than a diameter of said main piston (7), and said auxiliary piston (11) is operatively connected with said main piston (7) at least during a first phase of a stroke of the main piston (7) towards the distribution position, thereby reducing traction during the first phase of the stroke of the main piston (7) towards said distribution position, before hydraulic braking action begins and therefore without operating the brakes.
2. Apparatus (1) according to claim 1, wherein said control device (10) is a sensor suitable for emitting an electric signal which varies according to the position of said moving part (10b) with respect to said fixed part (10a), said moving part (10b) being fixed to the extremity of the auxiliary piston (11) which protrudes through the at least one open extremity (5a) of the containment body (5).

3. Apparatus (1) according to claim 1, wherein said control device (10) is a valve suitable for modifying the transmission conditions.

4. Apparatus (1) according to claim 1, wherein said auxiliary piston (11) is suitable for moving towards said detection position through the increase in pressure in the portion of said sliding chamber (6) placed between said main piston (7) and the auxiliary piston itself due to the movement of said main piston (7) towards said distribution position.

5. Apparatus (1) according to claim 1, further comprising a mechanical connection (27) connecting said auxiliary piston (11) to said main piston (7).

6. Apparatus (1) according to claim 5, wherein said auxiliary piston (11) is made integral with said main piston (7) by said mechanical connection (27), at least during the first part of the stroke of the main piston (7) towards said distribution position.

7. Apparatus (1) according to claim 6, wherein said mechanical connection (27) comprise i) a main elastic element (8) comprised of a first spring placed between said main piston (7) and said auxiliary piston (11) and ii) an auxiliary elastic element (12) comprised of a second spring that pushes said auxiliary piston (11) towards said reference position.

8. Apparatus (1) according to claim 7, wherein said first spring has an initial preload bigger than or the same as the preload of said second spring.

9. Apparatus (1) according to claim 7, wherein said mechanical connection (27) comprise additional elastic means (34) placed between said main piston (7) and said containment body (5) and suitable for contrasting the movement of said main piston (7) towards said distribution position.

10. Apparatus (1) according to claim 7, wherein said mechanical connection (27) comprise at least a first and a second connection element (27a, 27b) suitable for cooperating with said main piston (7) and with said auxiliary piston (11) respectively, said first spring is pre-compressed and placed between said connection elements (27a, 27b), and wherein said connection elements (27a, 27b) are connected to one another so as to prevent the extension of said first spring beyond a preset distance.

11. Apparatus (1) according to claim 10, wherein,
said pump-brake comprises at least an intermediate piston (20) placed between said main piston (7) and said auxiliary piston (11) and intermediate sealing means (21) placed between said intermediate piston (20) and said containment body (5) so as to split said thrust half-chamber (15) into a first and a second thrust half-chamber (15a, 15b) adjacent to one another, wherein said first spring is comprised of first and second pre-compressed springs (8a, 8b) located between said main piston (7) and said intermediate piston (20) and between the latter and said auxiliary piston (11) respectively, and
the initial preload of said first and second pre-compressed springs (8a, 8b) is bigger than or the same as the initial preload of said second spring (12) that pushes said auxiliary piston (11) towards said reference position, and
said mechanical connection (27) comprises at least a third and a fourth connection element (27c, 27d) suitable for cooperating with said intermediate piston (20) and connected, respectively, to said first and second connection element (27a, 27b).

12. Apparatus (1) according to claim 1, wherein said brake lever or pedal (9) is mechanically connected to said main piston (7).

13. Apparatus (1) according to claim 1, wherein that said sliding chamber (6) has at least a third section (6c) having a third diameter ($\Phi_3$) bigger than said first diameter ($\Phi_1$) and in which said main piston (7) is housed and wherein it comprises second main sealing means (16) placed between said third section (6c) and said main piston (7), between said first and said second main sealing means (13, 16) being defined in said sliding chamber (6) a further half-chamber (17) adjacent to said thrust half-chamber (15).

14. Apparatus (1) according to claim 13, wherein said brake lever or pedal (9) is connected to said main piston by a mechanical-fluid dynamic means (22) comprising at least a further feeding line (23) and at least a discharge line (24) of the operating fluid, wherein said containment body (5) and one of said main sealing means (13, 16) define in said sliding chamber (6) at least a third half-chamber (25) operating on said main piston (7) and arranged opposite said thrust half-chamber (15), said third half-chamber (25) being connectable to at least one between said further feeding line (23) and said discharge line (24), and wherein said mechanical-fluid dynamic means (22) comprise at least a distribution valve (26) placed between said brake lever or pedal (9) and said main piston (7) and moving between at least a first position, wherein it puts said further feeding line (23) in communication with said third half-chamber (25) to allow the movement of said main piston (7) towards said at least a distribution position, and at least a second position, wherein it puts said discharge line (24) in communication with said third half-chamber (25) to allow the return of said main piston (7) towards said idle position.

15. A control apparatus (1) for a vehicle, comprising:
a collection tank (S) containing operating fluid;
an operating fluid feeding line (2) connected to the collection tank (S);
an operating fluid delivery line (3) that connects to a braking system of the vehicle;
a pump-brake (4) comprised of
i) a containment body (5) which defines a sliding chamber (6) communicating with said feeding line (2) and with said delivery line (3), wherein the containment body (5) has an open extremity (5a) and the sliding chamber is a non-sealed, open chamber,
ii) a main piston (7) housed sliding inside said sliding chamber (6) and moving between an idle position and a distribution position for distributing a part of the operating fluid towards said delivery line (3), and
iii) an auxiliary piston (11) housed at least partially in said sliding chamber (6) and moving between a reference position and a detection position, said auxiliary piston (11) having a diameter smaller than a diameter of said main piston (7);
a brake lever or pedal (9) connected to the main piston (7), wherein movement of the brake lever or pedal (9) by an operator controls movement of said main piston (7), wherein said vehicle brake pedal causes movement of said main piston (7) towards said distribution position and said auxiliary piston (11) to move towards said detection position based on the movement of said main piston (7) towards said distribution position;
a control sensor (10) that controls the motion transmission of the vehicle, the control sensor (10) comprising a fixed part (10a) and a moving part (10b) that cooperates with the fixed part (10a), the moving part (10b) being fixed to the extremity of the auxiliary piston (11) which protrudes through the the at least one open extremity (5a) of the containment body (5), wherein, said auxiliary piston (11) is mechanically connected to said moving part (10b) to move said moving part (10b) with respect to said fixed part (10a) during said auxiliary piston's (11) movement between said reference position and said detection position such that said moving part (10b) moves based on the operation of said vehicle brake pedal of said brake lever or pedal (9) and resulting movement of said auxiliary piston (11) whereby said auxiliary piston (11) moves towards said detection position based on the movement of said main piston (7) towards said distribution position, wherein said sliding chamber (6) defines at least a first section (6a) having a first diameter ($\Phi_1$) and in which said main piston (7) is housed and at least a second section (6b) having a second diameter ($\Phi_2$) smaller than said first diameter ($\Phi_1$) and in which said auxiliary piston (11) is housed; and first main sealing means (13) placed between said first section (6a) and said main piston (7) and auxiliary sealing means (14) placed between said second section (6b) and said auxiliary piston (11) so as to define in said sliding chamber (6) at least one thrust sealed half-chamber (15) placed between said first main sealing means (13) and said auxiliary sealing means (14), wherein the auxiliary piston (11) includes an extremity opposite the main piston (7) and integral to the moving part (10b), the extremity of the auxiliary piston (11) protruding through the at least one open extremity (5a) of the containment body (5), and wherein said auxiliary piston (11) has a diameter smaller than a diameter of said main piston (7), and said auxiliary piston (11) is operatively connected with said main piston (7) during a first phase of a stroke of the main piston (7) towards the distribution position, thereby the smaller diameter of the auxiliary piston reducing traction during the first phase of the stroke of the main piston (7) before hydraulic braking action begins.

16. Apparatus (1) according to claim 15, wherein that said sliding chamber (6) further comprises a third section (6c) having a third diameter ($\Phi3$) bigger than said first diameter ($\Phi1$) and in which said main piston (7) is housed and a second main sealing element (16) placed between said third section (6c) and said main piston (7), and a further half-chamber (17) adjacent to said thrust half-chamber (15) and between said first and said second main sealing elements (13, 16).

17. Apparatus (1) according to claim 15, wherein, said pump-brake further comprises an intermediate piston (20) placed between said main piston (7) and said auxiliary piston (11) and an intermediate sealing element (21) placed between said intermediate piston (20) and said containment body (5) so as to split said thrust half-chamber (15) into a first and a second thrust half-chamber (15a, 15b) adjacent to one another, further comprising i) a spring (12) that pushes said auxiliary piston (11) towards said reference position, and ii) first and second pre-compressed springs (8a, 8b) located respectively between said main piston (7) and said intermediate piston (20) and between the intermediate piston (20) and said auxiliary piston (11), wherein an initial preload of said first and second pre-compressed springs (8a, 8b) is bigger than or the same as the initial preload of the spring (12) that pushes said auxiliary piston (11) towards said reference position.

* * * * *